R. M. HUNTER.
Harvester.

No. 236,680. Patented Jan. 18, 1881.

Attests  Inventor

UNITED STATES PATENT OFFICE.

RUDOLPH M. HUNTER, OF PHILADELPHIA, PENNSYLVANIA.

HARVESTER.

SPECIFICATION forming part of Letters Patent No. 236,680, dated January 18, 1881.

Application filed November 20, 1879.

*To all whom it may concern:*

Be it known that I, RUDOLPH M. HUNTER, of Philadelphia, Pennsylvania, have invented new and useful Improvements in Harvesting-Machines, of which the following is a specification, reference being had to the accompanying drawings.

Figure 4:
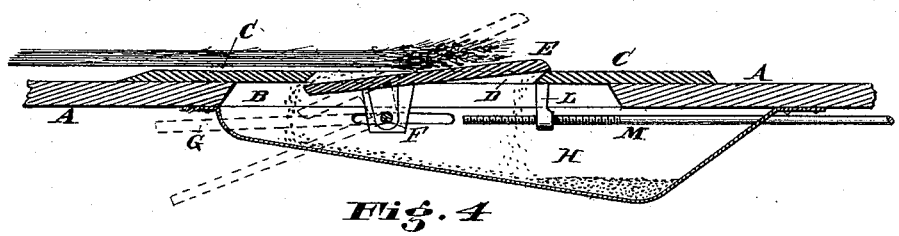

My invention relates to harvesting-machines in general; and it consists in an attachment thereto of a vibrating plate within an aperture in the platform of a harvesting-machine, and in such a position that the heads of the grain shall fall upon said vibrating plate, Figure 4; further, in making said vibrating plate adjustable upon the platform to suit any height of grain; further, in having a trough attached to the rear or discharging end of the platform; finally, in having a grain-box beneath the vibrating plate and a connection between said box and the trough.

The object of my invention is to prevent the great loss of grain which now takes place when the grain is thrown upon the platform after being cut and while being raked therefrom to the ground, or while it is being bound into a bundle.

Figure 1:
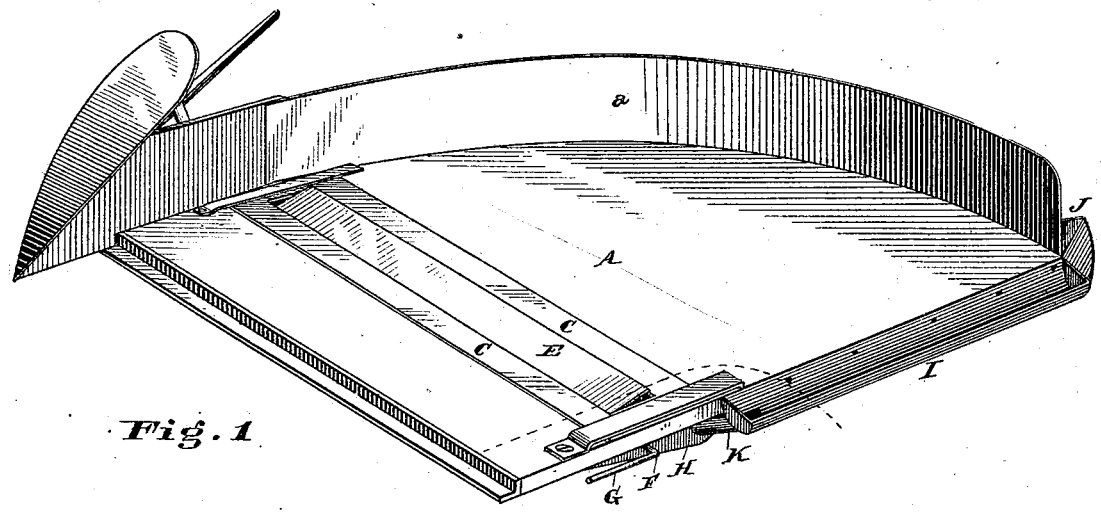
Figure 2:
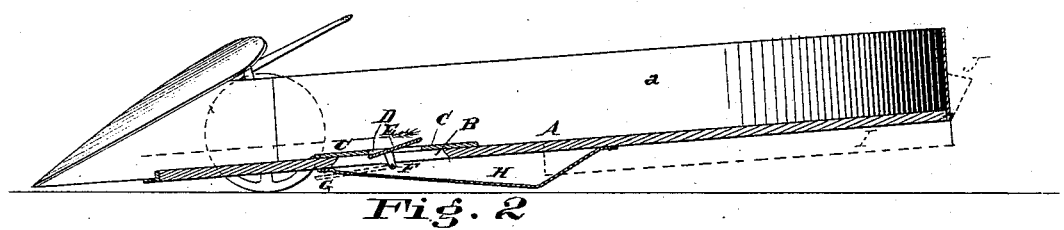
Figure 3:
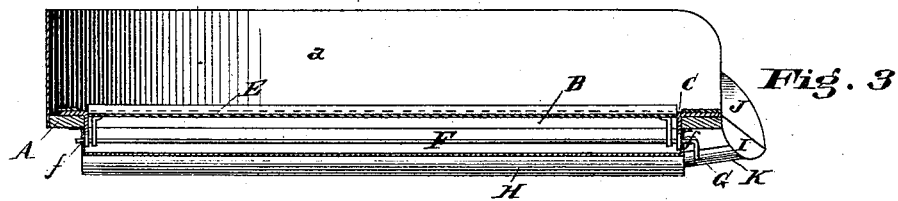

In the drawings, Figure 1 is a perspective view of a platform of a harvesting-machine embodying in it my improvements. Fig. 2 is a longitudinal section through the same. Fig. 3 is a cross-section of same. Fig. 4 is an enlarged sectional view of the vibrating plate and its connections.

A is a platform of a harvesting-machine. B is an aperture in platform A, and is covered by a slotted plate, C, and a plate, E, which may vibrate or be set on an incline to the horizontal within the slot D. The plate E is secured to the shaft F, having bearings at *f*, and a crank or lever, G, which may be vibrated by any suitable mechanism in connection with the usual machinery. Under the aperture B is a grain-box, H.

I is a trough, the outer lip of which is preferably lower than the platform A to which said trough is fastened. At the rear end of the trough I, and connecting it to the side board, *a*, is a piece of sheet metal, J, which catches any grain which may be freed by the side board and deposits it in the trough. The front end of the trough I is connected with the grain-box H by a tube, K, so that any grain caught by the trough is fed into the grain-box.

To adjust the vibrating plate E the plate C which carries it may be provided with one or more lugs, L, through which screws M work and are operated from the rear of the machine. The plate E is adjusted for a field of grain at the start, and is not touched again until finished, unless the grain had been sown at intervals and was of various heights. The plate E may be adjusted in any other suitable manner. It is not necessary that this plate E should vibrate, but I prefer that it do so in most cases. When it is not vibrated it is held at an incline, as shown in Fig. 4, and the inclination is always toward the front of the platform, so that neither the grain nor rake shall catch in it or the opening D. If desired, the entire platform may be composed of these inclined plates; but this being mere duplication of parts, there would be no invention over that herein shown and claimed.

The operation is as follows: The harvesting-machine being put in motion, it stands on a slight incline, as shown in Fig. 3. The plate E being properly adjusted for the height of grain to be cut, the operation begins. As the grain falls the heads strike the plate E, and any ripe loose grain falls out and runs down the vibrating or inclined plate into the box H. As the gavel is being formed fresh grain is thrown upon that already there by the reel-arms, and consequently more of the ripe grain is liberated, and to insure its being deposited in the box H the plate E is kept in a state of vibration, which action causes the grain to fall through the lower part of the gavel and into the box. When the rake sweeps this gavel along the platform A the side board, *a*, and friction on the platform liberate more loose grain, and any which is still left among the gavel tends to find the platform A during its passage to the rear, and as it is raked from the platform to the ground the loose grain is brushed into the trough I, which being on an incline, as shown in Fig. 2, the grain therein runs down and through the tube K into the box H, from which it may be withdrawn in any convenient manner and put into bags, which bags can be left standing in the field while the harvester continues its course.

The most convenient manner of withdrawing the grain is to have a scraper in shape to fit the bottom of box H and a closed mouth at one side of the box, and after placing the mouth of the bag to the mouth open the same and then draw the scraper out, and the grain will be discharged into the bag. Any suitable automatic arrangement may be used, if desired, but that increases the expense.

The same action takes place with reference to the plate E and trough with every newly-laid gavel.

The grain may be bagged after cutting each acre.

This invention is applicable to the harvester set forth in the patent to Samuel Johnston, No. 222,633, December 16, 1879, by simply placing a seed-box under the juncture of the revolving platform, which performs the function of the inclined plate, and the main or rigid platform, and insuring that the edge of the round revolving plate or platform shall be under the edge of the rigid platform, and so constructing the platform that it shall be inclined to the horizon.

I claim—

1. In a harvesting-machine, a platform, A, upon which the grain falls as it is cut, provided with an aperture, B, in combination with a plate, E, inclined upward from front to back, and a grain-box, H, or its equivalent, substantially as and for the purpose specified.

2. In a harvesting-machine, a platform upon which the grain falls as it is cut, in combination with a trough secured to its discharging end, the loose shelled grain being collected and swept from the surface of the platform into the trough by the straw, &c., as it is discharged from said platform, substantially as and for the purpose specified.

3. In a harvesting-machine, a platform, A, upon which the grain falls as it is cut, provided with an aperture, B, in combination with slotted plate C, carrying a plate, E, and grain-box H, substantially as and for the purpose specified.

4. In a harvesting-machine, the combination of platform A, having an aperture, B, plate E, grain-box H, and trough I, substantially as and for the purpose specified.

5. In a harvesting-machine, a platform upon which the grain falls as it is cut, in combination with an inclined plate so arranged thereon and over an opening in same that the heads of grain shall fall upon said plate, substantially as and for the purpose specified.

6. In a harvesting-machine platform upon which the grain falls as it is cut, the combination of a plate, C, with a plate, E, substantially as and for the purpose specified.

7. In a harvesting-machine, a platform upon which the grain falls as it is cut and from which it is swept by rakes or their equivalents, provided with a single rectangular aperture in the solid platform parallel to the cutter-bar, and at such a distance from the same that the heads of the grain shall fall over the aperture when cut and the straw shall lie upon the solid platform before being swept off, substantially as and for the purpose described.

In testimony of which invention I hereunto set my hand.

RUDOLPH M. HUNTER.

Witnesses:
R. A. CAVIN.
GEORGE E. BUCKLEY.